(12) United States Patent
Hofer et al.

(10) Patent No.: US 8,974,568 B2
(45) Date of Patent: Mar. 10, 2015

(54) INERTIAL SEPARATOR FOR GAS LIQUID SEPARATION

(71) Applicant: Belenos Clean Power Holding AG, Bienne (CH)

(72) Inventors: Marcel Hofer, Villmergen (CH); Klaus Werner Hoyer, Baden (CH)

(73) Assignee: Belenos Clean Power Holding AG, Bienne (CH)

( * ) Notice: Subject to any disclaimer, the term of this patent is extended or adjusted under 35 U.S.C. 154(b) by 53 days.

(21) Appl. No.: 13/752,751

(22) Filed: Jan. 29, 2013

(65) Prior Publication Data

US 2013/0205730 A1 Aug. 15, 2013

(30) Foreign Application Priority Data

Feb. 13, 2012 (EP) .................................... 12155151

(51) Int. Cl.
| | |
|---|---|
| *B01D 45/12* | (2006.01) |
| *B01D 45/16* | (2006.01) |
| *B04C 5/04* | (2006.01) |
| *B04C 5/13* | (2006.01) |
| *B04C 5/181* | (2006.01) |

(52) U.S. Cl.
CPC . *B01D 45/16* (2013.01); *B04C 5/04* (2013.01); *B04C 5/13* (2013.01); *B04C 5/181* (2013.01)
USPC ................ 55/459.1; 55/447; 55/458; 55/424; 55/426

(58) Field of Classification Search
USPC ............ 55/447, 459.1, 458, 424, 426; 95/271
See application file for complete search history.

(56) References Cited

U.S. PATENT DOCUMENTS

| | | | |
|---|---|---|---|
| 3,034,647 A * | 5/1962 | Giesse | .......................... 209/710 |
| 4,067,814 A | 1/1978 | Surakka et al. | |
| 2007/0084340 A1 | 4/2007 | Dou et al. | |

FOREIGN PATENT DOCUMENTS

| | | |
|---|---|---|
| DE | 10-2009-005157 A1 | 7/2010 |
| EP | 1323478 A2 | 7/2003 |
| FR | 1248898 A | 12/1960 |
| GB | 556286 A | 9/1943 |

OTHER PUBLICATIONS

European Search Report of EP 12 15 5151 dated Jun. 28, 2012.

\* cited by examiner

*Primary Examiner* — Dung H Bui
(74) *Attorney, Agent, or Firm* — Sughrue Mion, PLLC

(57) ABSTRACT

The present invention relates to an inertial separator for gas liquid separation, comprising:
  a tubular body (12) having an inlet (14) extending through a sidewall of the body (12) substantially in tangential direction,
  an annular duct (16) arranged inside the tubular body (12) and being in fluid communication with the inlet (14),
  wherein the annular duct (16) extends into an interior chamber (18) of the tubular body (12) via an annular gap (20) extending between an inside facing side wall portion (15) of the body (12) and a first insert (30; 50).

14 Claims, 3 Drawing Sheets

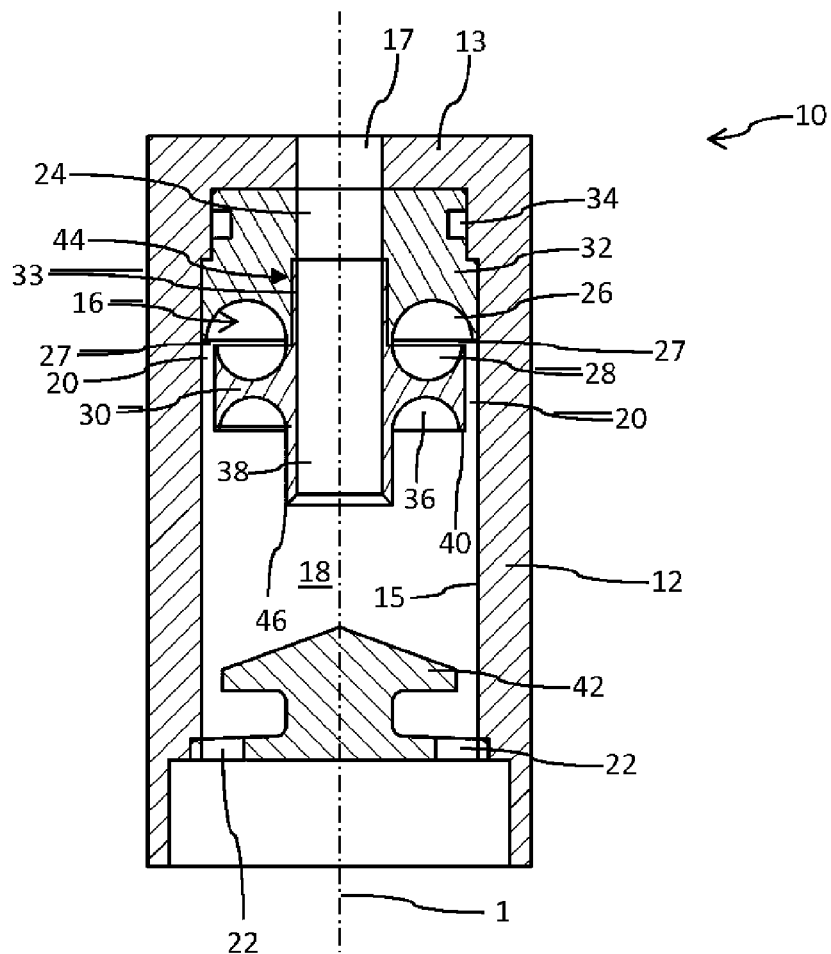
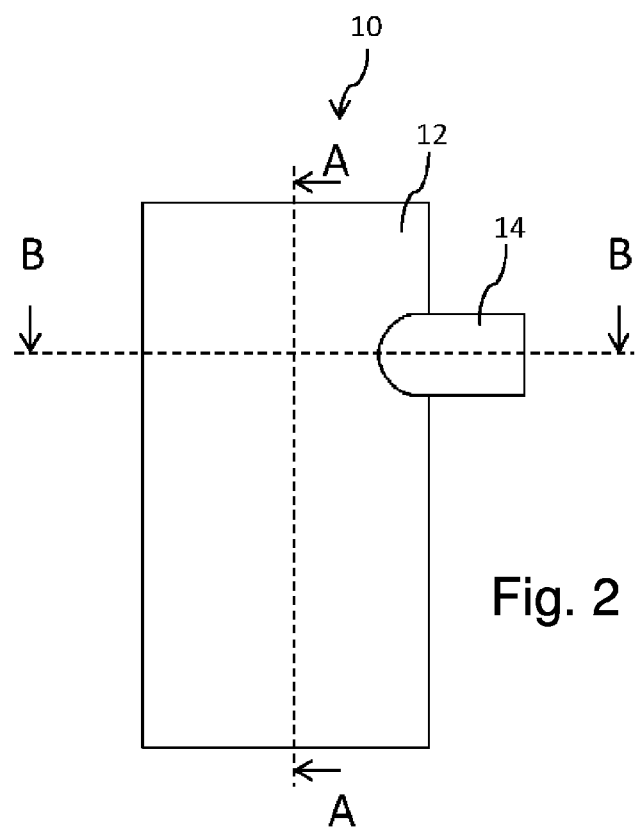
Fig. 1
A-A
Fig. 2

B-B

C-C

A-A

INERTIAL SEPARATOR FOR GAS LIQUID SEPARATION

This application claims priority from European Patent Application No. 12155151.9 filed Feb. 13, 2012, the entire disclosure of which is incorporated herein by reference.

FIELD OF THE INVENTION

The present invention relates to an inertial separator for separating gaseous and liquid components of a gas-liquid-two-phase-fluid.

BACKGROUND AND PRIOR ART

Inertial separators or so-called cyclone vapour-liquid separators are well known in the prior art. Typically, such separators comprise a cylindrical or tubular container and a tangentially oriented inlet, by way of which a two-phase fluid comprising gaseous and liquid components can be delivered to the interior chamber of the container thereby imposing a vortex or swirling motion of the two-phase fluid.

Centrifugal forces arising from the swirling or vortex-like flow of the two-phase fluid cause the liquid components to spread radially outwardly to impinge on the cylindrical inner wall surface of the container. There, liquid droplets will form that are to be discharged via a respective outlet. The remaining gaseous phase may exit the container via a separate outlet.

The degree of gas liquid separation strongly depends on the geometry of the container and its hydrodynamic properties. Since centrifugal forces strongly depend on the radius and internal diameter of the container as well as on the flow velocity of the two-phase fluid, an increase of the efficiency of separating gaseous and liquid phases generally requires comparatively large dimensions of such cyclone or inertial separators.

Document EP 1 323 478 A2 discloses a vapour-liquid separator having an inlet tube upstream of an outer tube, which partially constitutes an introduction path of said vapour-liquid separator. There, a narrow plate twisted at a predetermined pitch is fixedly provided within the inlet tube in order to impart a swirling state to the vapour-liquid two-phase fluid.

However, such an embodiment requires a particular shape and arrangement of the inlet tube, thereby limiting the field of application of such cyclone separators. When such separators are to be implemented in an automotive environment, the inertial or cyclone separator should be universally adaptable to a variety of different places of installation. Moreover, the overall geometry of the inertial separator should be comparatively compact and small in size. Despite geometric restrictions, the inertial separator should provide an improved gas liquid phase separation. The separator should further be lightweight and easy as well as cost efficient in terms of manufacturing and assembly.

SUMMARY OF THE INVENTION

The present invention therefore provides an inertial separator for gas liquid separation which is based on the cyclone separator principle. The inertial separator comprises a tubular body having an inlet extending through a sidewall of the body substantially in tangential direction. By way of a tangentially extending inlet, the two-phase fluid to be supplied by the inlet enters the tubular body in a radial peripheral region thereof. This way, a swirling- or vortex flow can be inherently imparted to the supplied two-phase fluid.

In the present context, tangential and circumferential as well as radial and axial or longitudinal direction refer to the overall geometry of the tubular shaped body of the separator.

The inertial separator also comprises an annular duct arranged inside the tubular body and being in fluid communication with the inlet. The annular duct is adapted to generate an additional swirling motion of the two-phase fluid, thereby supporting generation of a two-stage vortex flow inside the tubular body of the inertial separator. The annular duct serves as a pre-vortex generator by way of which the supplied two-phase fluid may experience a kind of pre-separation.

The annular duct extends into an interior chamber of the tubular body via an annular gap which extends between and inside facing sidewall portion of the body and a first insert. The first insert may provide the annular duct, which preferably extends over its entire circumference into the interior chamber by the annular and axially extending gap.

By way of the annular gap a fluid communication between annular duct and interior chamber is provided. Inside the annular duct, which extends along the inner circumference of the cylindrical sidewall of the tubular body, a first swirling or vortex flow of the two-phase fluid can be supported and/or excited. The first vortex rotates in a plane defined by the longitudinal and radial direction of the tubular body, whereas a second vortex or swirling motion of the two-phase fluid downstream of the annular duct and inside the tubular body rotates in tangential or circumferential direction with respect to the tubular shape of the body. In effect the first vortex is superimposed to the second vortex.

Hence, the second vortex rotates along the inside facing sidewall of the tubular body and therefore in a plane extending substantially perpendicular to the longitudinal central axis of the tubular body.

The first vortex to be generated in the annular duct or annular channel propagates in tangential or circumferential direction, wherein the vortex motion lies in the plane defined by the axial and radial direction of the tubular body. Since, the annular gap extends in axial direction between the insert and the inside facing sidewall portion of the body, it supports a circumferential and axially directed fluid flow. Due to the fluid connection between the annular duct and the interior chamber which is provided by the annular gap, the direction of propagation of the first vortex flow may substantially coincide with the swirling or vortex direction of the second vortex flow evolving downstream in the interior chamber. In other words propagation of the two-phase fluid in the annular duct in circumferential or tangential direction may substantially drive or support the generation of a vortex motion of the fluid in the interior chamber of the body.

According to a preferred embodiment, the annular centre of the annular duct substantially coincides or overlaps with a longitudinal axis of the tubular body. Hence, in the plane perpendicular to the longitudinal axis of the tubular body, the annular duct and the tubular body are concentrically arranged. In particular, when the first insert is of substantially circular symmetric shape, a concentric arrangement of the annular duct and the tubular body with its interior chamber can be achieved by a concentric arrangement of the first insert inside the interior chamber.

Given that the annular duct extends in radial and tangential direction, the annular centre thereof defines a central point or a point of annular symmetry of the duct which lies inside the transverse or radial and tangential plane, in which the annular or ring-like structure extends.

In a further preferred embodiment, the annular duct provides an annular vortex chamber downstream of the inlet and upstream of the annular gap, hence upstream of the interior chamber of the inertial separators' tubular body. The ring-like annular vortex chamber comprises an internal structure that supports generation of a swirling- or vortex-like flow. The annular duct may therefore comprise at least one guide plate or a respective deflector, which may support or amplify vortex flow generation when exposed to a stream of a two-phase fluid. However, a vortex flow may also evolve only due to the internal geometry of the annular duct even without particularly shaped guiding plates or deflectors.

In a further preferred embodiment, the annular duct is arranged at an upper end of the interior chamber of the tubular body. Preferably, the inertial separator is arranged vertically with its longitudinal axis pointing in vertical direction. The inlet is preferably arranged at an upper end of the tubular body, whereas an outlet for the liquid phase is located at a bottom end thereof. This way, separation of the gaseous and the liquid phase may be effectively supported by the influence of gravity.

A pre-separation of gaseous and liquid phases by means of the annular duct may lead to the formation and accumulation of liquid particles at the inside facing surface of the sidewall portion of the body. Since the annular duct and hence the annular gap extending thereof are arranged at the upper end of the interior chamber, accumulated humidity may rinse downward along the inside facing sidewall portions of the tubular body towards the liquid outlet provided at a bottom portion of the tubular body.

A gas- or vapour outlet is preferably provided at an opposite end, hence at an upper portion of the tubular body. The gas outlet is preferably arranged in the centre of the tubular body and is preferably arranged concentric thereto while the oppositely disposed liquid outlet is preferably arranged adjacent the inside facing sidewall portion of the tubular-shaped body. Here, the liquid outlet may comprise several through openings that may be equidistantly arranged adjacent the inside facing sidewall of the body at a bottom portion thereof. Instead of a plurality of separated through opening also an annular outlet structure is conceivable.

In a further preferred embodiment, the annular duct comprises an annular and half-shell shaped upper duct portion and a correspondingly shaped lower duct portion. Preferably, the two duct portions mutually complement to provide a substantially closed ring-shaped annular duct or annular channel when upper and lower duct portion are arranged and assembled in a predefined way. The half-shell shaped upper and lower duct portion may comprise a semi-circular or convex cross section in a plane extending in radial and axial direction. In tangential or circumferential direction the upper and/or lower duct portion comprise a closed annular or ring structure.

By separating the annular duct into upper and lower duct portion, respective duct-forming members or components of the inertial separator can be designed to be free of undercuts. This way, the individual components can be easily manufactured by way of injection molding techniques.

In a further preferred embodiment, the upper duct portion and the lower duct portion face towards each other with their half-shell profiles to form a substantially closed duct. However, the duct is not entirely closed but extends into the annular gap in order to provide an escape channel towards the interior chamber of the tubular body. In the present context, a substantially closed duct defines a duct-or channel structure featuring a comparatively small gap extending in tangential direction with respect to the cross section of the duct and hence in axial direction with respect to the tubular body.

Typically, the gap size is smaller than 70%, 60%, 50%, 40%, 30%, 20%, 10% and/or smaller than 5% of the diameter of the duct and/or of anyone of the half-shell profiles of lower and/or upper duct portion.

In another embodiment, the transverse cross-sectional area of the annular gap is at least 0.2-, 0.3-, 0.5-, 1-, 1.5-, 2-, 3-, 4-, or 5 times the cross section of the inlet. Preferably, the transverse cross-sectional area of the annular gap ranges between 1 to 1.5 times the cross section of the inlet. By modifying the transverse cross section of the annular gap, i.e. in the plane perpendicular to the longitudinal direction of the tubular body, pressure loss of the separator and overall flow characteristics of the two-phase-fluid therein can be varied appropriately.

In other embodiments, the annular gap size Since, the total transverse cross-section of the annular gap, i.e. its cross section perpendicular to the longitudinal axis of the body, is at least as large as the inner diameter of the inlet, an impact of the annular duct on the overall pressure loss of the inertial separator can be kept at an acceptable level.

Furthermore, the radial width as well as the axial length of the annular gap may vastly control and influence the separating efficiency of the inertial separator. Hence, by appropriately modifying the geometric dimensions of the annular gap, the overall flow behavior of the fluids inside the body can be precisely manipulated.

According to a further preferred embodiment, the cross sectional diameter of the upper duct portion exceeds the corresponding diameter of the lower duct portion by the radial width of the annular gap. Preferably, upper and lower duct portions smoothly merge into each other in a radially inwardly located portion. Radially outwardly, the upper duct portion exceeds or projects from the lower duct portion radially outwardly, thereby extending into the annular gap.

Upon supplying a two-phase fluid via the inlet to the annular duct, the two-phase fluid tends to escape into the interior chamber located underneath via the annular gap. This way, a kind of suction effect may arise supporting the generation of the first vortex flow inside the annular duct. The two-phase fluid entering the annular duct may therefore be guided via the lower duct portion towards the upper duct portion. When passing from the upper duct portion towards the lower duct portion, a portion of the two-phase fluid branches off and enters the annular shaped and axially extending gap towards the interior chamber.

The annular gap is equally permeably for the gaseous and for the fluid phase of the two-phase fluid. The first vortex generated in the annular duct may already lead to accumulation of fluid particles, which may flow through the annular gap. Preferably, the annular duct is axially aligned with the fluid outlet of the tubular body. In effect, fluid particles separated from the two-phase fluid in the annular duct may rinse along the inside facing sidewall of the body or may drip down from a drip edge of the insert located adjacent the annular gap.

Upper and lower duct portion may comprise a somewhat semi-circular shaped half-shell profile, wherein the cross-sectional diameter or radius of the upper duct portion is slightly larger than the respective diameter or radius of the lower duct portion. Apart from that it is conceivable, that the half-shell profiles of upper and/or lower duct portions do not strictly follow a semi-circular shape. Instead, the radius of the so-called half-shell profiles may constantly increase along the radial and axial cross section of the upper and/or lower duct portions. This way, a flow-optimized profile of the annular duct can be provided.

In other words, the annular duct may then comprise a substantially spiral shaped cross section merging in the annular gap, whereby said cross section extends in axial and radial direction with respect to the overall geometry the tubular-shaped body.

According to another embodiment, the centre of the inlet substantially co-aligns with the centre of the annular duct. When supplying a two-phase fluid to the inlet, the upper and lower duct portions of the annular duct are fed with the two-phase fluid at substantially equal flow rates.

Alternatively, it is also conceivable, to arrange the inlet with an axial offset with respect to the centre of the annular duct. Then, flow rates in the upper and lower duct portions may vary accordingly, which, depending on the type of two-phase fluid may have an impact on the generation of the first vortex flow inside the annular duct and the overall separation properties of the separator.

In a further preferred embodiment, the lower duct portion is formed in the first insert having an axially extending central shaft portion. The central shaft portion may extend axially downward inside the tubular body and may also extend upward towards an upper end of the tubular body in order to provide a centrally located outlet for the gaseous component.

It is of further benefit and according to another preferred embodiment, when the upper duct portion is formed in a second insert extending across the cross section of the interior chamber and having a central outlet channel being in fluid communication with the shaft portion of the first insert. First and second inserts, which provide lower and upper duct portions can be manufactured separately from the tubular body and may be assembled therein to form the annular duct. This way, a plurality of different first and second inserts with differently shaped lower and upper duct portions can be universally assembled in a common tubular body.

Furthermore, a kind of construction kit comprising a variety of first and second inserts can be provided, which allow to universally modify and to universally adapt the inertial separator to different types of two-phase fluids. The second insert may serve as a kind of lid for the tubular shaped body and may be sealed against the inside facing sidewall portion of the body. However, if the body comprises a cupped receptacle towards an upper end, the second insert may only have to be fixed therein. By fastening the second insert inside the tubular body, the second insert may further provide a fastening support for the first insert.

Preferably, first and second inserts mechanically engage by means of the shaft portion and the outlet channel of first and second inserts being in fluid communication with each other. Preferably, the outlet channel of the second insert is adapted to receive an upward extending central shaft portion of the first insert. Mutual engagement of central shaft portion and outlet channel may be provided by a variety of fastening mechanisms. For instance, shaft portion and outlet channel may be provided with mutually corresponding threads in order to establish a threaded interconnection of first and second insert.

Alternatively and according to another preferred embodiment, the shaft portion and the outlet channel of first and second inserts, respectively, are mutually press fitted. Shaft portion and outlet channel and hence first and second inserts may therefore frictionally engage. This way, an intuitive and quick mutual assembly of first and second inserts can be attained.

In an alternative embodiment it is also conceivable, that the first insert comprises an outlet channel or a respective receptacle adapted to receive a shaft portion of the second insert extending downward in axial direction. Also here, a threaded or press fitted mutual engagement of first and second inserts is generally conceivable.

In still another aspect, the body, the first insert and/or the second insert are substantially free of undercuts. This allows to manufacture the body, the first and/or second inserts by way of injection molding.

Preferably and according to another embodiment, the body, the first insert and/or the second insert comprise injection molded plastic components, such as polyoxymethylene (POM) or Polypropylene (PP). By manufacturing the inertial separator or selected components thereof in form of an injection molded plastic components, production costs as well as overall weight of the inertial separator can be effectively decreased compared to separators comprising e.g. metal components.

BRIEF DESCRIPTION OF THE DRAWINGS

In the following, preferred embodiments of the invention will be described by making reference to the drawings, in which:

FIG. 1 shows a cross section through the inertial separator along A-A,

FIG. 2 schematically illustrates the tubular body of the inertial separator as seen from outside.

DETAILED DESCRIPTION

Figure 3:
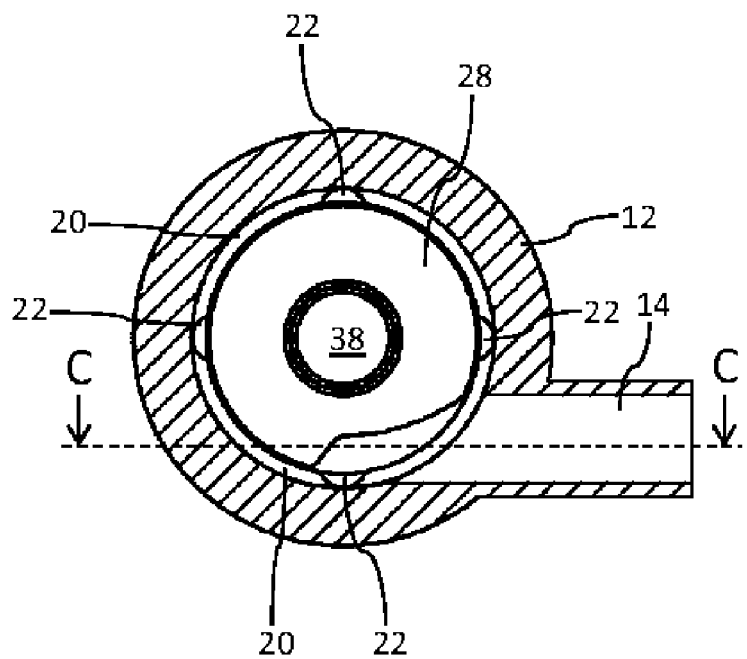
FIG. 3 shows a transverse cross section along B-B according to FIG. 2.

The inertial separator 10 as shown in FIGS. 1 and 2 comprises a substantially tubular shaped body 12 that serves as a housing and which comprises an interior chamber 18, which is delimited in radial direction by the inner sidewall 15 of the body 12. In upward direction the interior chamber 18 is limited by a first insert 30, whereas in the opposite direction, the interior chamber 18 extends into various fluid outlets 22 located at a bottom of the body 12.

The inlet 14 as illustrated in FIGS. 2 and 3 extends through the sidewall of the body 12 in tangential direction. Hence, the inlet 14 is arranged laterally or radially offset from a longitudinal central axis 1 of the body 12. At its upper end, the body 12 comprises a cover portion 13, which is intersected by a central through opening 17 through which the gaseous phase of the two-phase fluid may exit after liquid and gaseous phases have been effectively separated.

Near the upper end of the body 12 there is arranged a second insert 32 which substantially extends across the entire transverse cross section of the interior chamber 18. The second and upper insert 32 comprises a central outlet channel 24 which flushes with the through opening 17 of the body 12. Additionally, the second insert 32 comprises an annular shaped half-shell profile forming an upper duct portion 26 of an annular duct 16.

The annular duct 16 is formed by said upper duct portion 26 and by a lower duct portion 28, the latter of which is formed by a first insert 30. This first insert 30 comprises a lower duct portion 28 in form of a half-shell profile and is adapted to form a substantially closed duct or annular channel structure 16 when assembled in abutment with the second insert 32.

For mutually assembling first and second inserts 30, 32, the first insert comprises a centrally located and axially extending shaft portion 33 forming a channel extending axially into the interior chamber 18. Said shaft portion 33 also extends axially upwardly and engages with the outlet channel 24 of the second insert 32. Mutual interconnection of first and second inserts 30, 32 may for instance be established by mutually corresponding threads of the outlet channel 24 and the shaft portion 33.

Alternatively, and as illustrated in FIG. 1, outlet channel 24 and shaft portion 33 may be mutually fastened by means of a press fit 44, providing a frictional engagement of first and second inserts 30, 32.

The concave or semi-circular shaped half-shell profiles of lower duct portion 28 and upper duct portion 26 face towards each other to form a substantially closed annular duct 16. However, as for instance shown in FIGS. 1 and 4, the radial extend of the lower duct portion 28 is slightly smaller compared to the corresponding radial extend of the upper duct portion 26. This way, the upper duct portion 26 projects radial outwardly over the lower duct portion 28 and therefore extends into an annular shaped and axially extending gap 20 provided between the first insert 30 and the inside facing sidewall portion 15 of the body 12.

Figure 4:
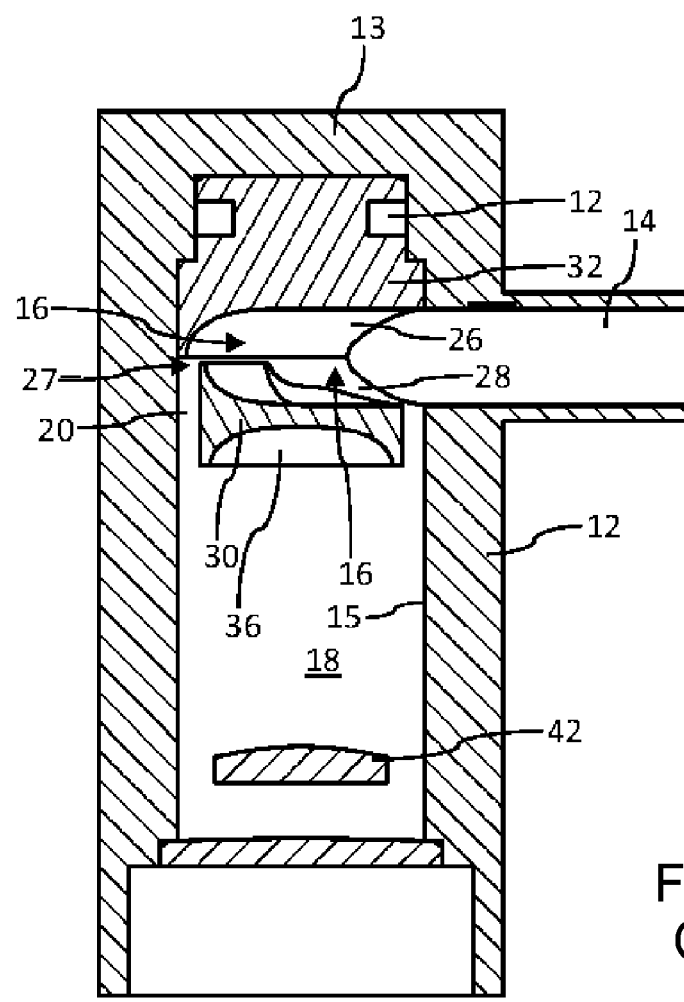
FIG. 4 shows a longitudinal cross section along C-C according to FIG. 3

The annular duct 16 as formed by upper and lower duct portions 26, 28 is located downstream of the inlet 14 as illustrated in FIGS. 3 and 4. Hence, the two-phase fluid to be provided via the inlet 14 enters the annular duct 16 in tangential direction. Due to the annular escape gap 20, a first vortex flow may built up inside the annular duct 16 travelling radially inwardly along the lower duct portion 28 and flowing radially outwardly along the upper duct portion 26. This swirling or vortex flow which may establish inside the annular duct 16 provides a pre-separation of the gaseous and liquid phase of the two-phase fluid. Liquid particles may impinge the sidewalls of upper and lower duct portions 26, 28 and may be carried away by the vortex flow through the annular gap 20 towards the interior chamber 18.

Liquid particles which are urged or which drip through the annular gap 20 may rinse down along the inner surface 15 of the sidewall of the body 12 directly into the fluid outlet 22 at the bottom portion of the body 12. However, since the inlet 14 is arranged tangentially with respect to the tubular body 12, the two-phase fluid propagating through the annular duct 16 will travel towards the interior chamber 18 while maintaining its angular momentum with regard to the longitudinal axis 1 as axis of rotation.

Consequently, when the two-phase fluid enters the interior chamber 18 via the annular gap 20, a vortex flow swirling around the longitudinal axis 1 will establish, by way of which further liquid components of the two-phase fluid may impinge the inside facing surface 15 of the sidewall of the body 12. Depending on the axial length and the radial width of the annular gap 20, the angle and the flow rate at which the two-phase fluid enters the interior chamber 18 can be precisely modified in order to optimize a degree of gas liquid separation.

While the liquid component or components collect radially outwardly at the sidewall 15 on the body 12, the gaseous component or components flow through the channel 38 of the first insert 30 and through the outlet channel 24 of the second insert 32.

A peg 42 provided on the bottom portion of the body 12 and exhibiting a mushroom-like geometry serves to carry fluid particles radially outwardly towards the outlets 22, which according the sketch of FIG. 3 are arranged equidistantly at about 90° adjacent the inside facing surface 15 of the sidewall of the body 12.

The peg 42 is arranged below a drip edge 46 of the channel 38 of the first insert 30. Any droplets dropping down from such a drip edge 46 impinge on the slanted upper surface of the peg 42 and may rinse down towards the outlet 22.

The first insert 30 not only comprises a lower duct portion 28 but also has an upper duct portion 36 located at its bottom portion facing towards the interior chamber 18. This upper duct portion 36 may support redirection of the two-phase fluid inside the interior chamber 18. The swirling two-phase fluid flowing actually upward between the channel 38 and the outer body 12 may be redirected by the curved and annular shaped upper duct portion 36, which therefore serves as a guide structure or as a deflector to direct the two-phase fluid radially outward and downward again. Consequently, between the upper duct portion 36 and the annular gap 20 there is provided a drip edge 40 which supports a controlled dripping down of accumulated fluid particles.

Moreover, as shown in FIG. 1, upper and lower duct portions 26, 28 may be separated by a transverse slit 27, by way of which the flow from the annular duct 16 towards the annular gap 20 can be controlled. Furthermore, as indicated in FIGS. 1 and 4, the second insert 32 comprises an annular groove 34 which serves to receive a seal in order to effectively seal the interior chamber 18 from the gas outlet 24.

Figure 5:
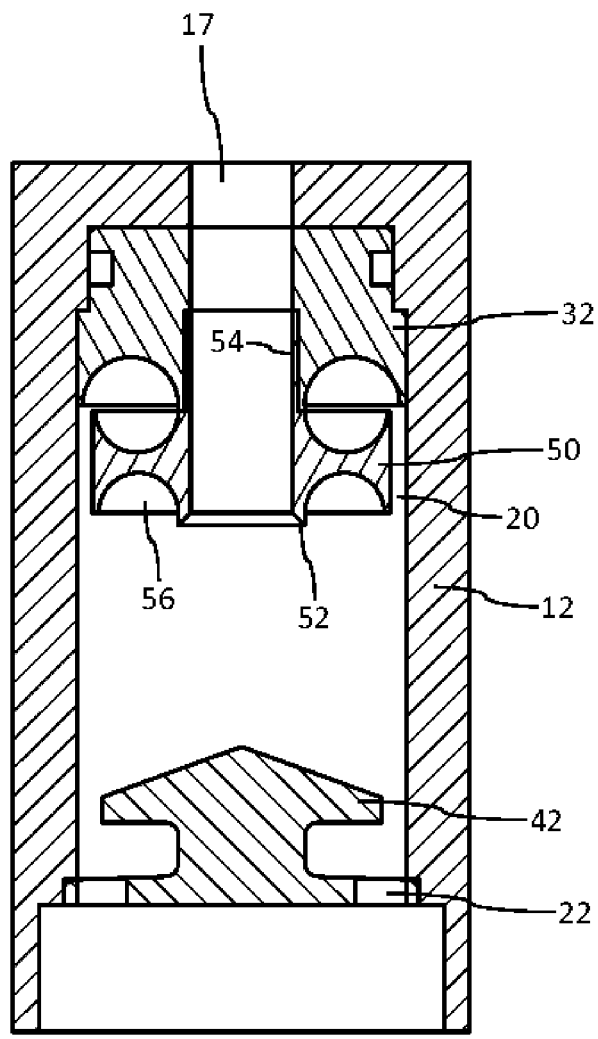
FIG. 5 shows another embodiment of the inertial separator in a cross section along A-A.

In the embodiment according to FIG. 5, the first insert 30 as shown in FIG. 1 has been replaced by a modified insert 50. Here, the insert 50 no longer comprises a downward extending channel 38 but terminates with a drip edge 52 in close proximity to the upper duct portion 56. Apart from that modification, the insert 50 also comprises an upward extending shaft portion 54 by way of which a press fit connection with the second insert 32 can be established as described above.

By providing an annular duct to generate a first vortex or swirling flow, the separation efficiency of the inertial separator can be remarkably increased, which allows to reduce the overall size of such separators. In effect such separators can be more easily implemented in automotive applications, e.g. for separating reactants and fuel gases of a fuel cell assembly. Moreover, by providing several separate components, namely a tubular shaped body 12, a first insert 30 and a second insert 32, all components of the inertial separator 10 can be manufactured by way of injection molding and can be mutually assembled thereafter.

Costs for manufacturing and assembling of such inertial separators can therefore be reduced and all components thereof can be made of plastic to provide a light weight design of the inertial separator.

LIST OF REFERENCE NUMERALS 1 longitudinal axis
10 inertial separator
12 body
13 cover portion
14 inlet
15 inner sidewall portion
16 annular duct
17 through opening
18 interior chamber
20 annular gap
22 outlet
24 outlet
26 upper duct portion
27 slid
28 lower duct portion
30 first insert
32 second insert
33 shaft portion
34 groove
36 upper duct portion
38 channel 40 drip edge
42 peg
44 press fit
46 drip edge
50 first insert
52 drip edge
54 shaft portion
56 upper duct portion

What is claimed is:

1. An inertial separator for gas liquid separation, comprising:
   a tubular body (12) having an inlet (14) extending through a sidewall of the tubular body (12) in a tangential direction,
   an annular duct (16) arranged inside the tubular body (12) and being in fluid communication with the inlet (14),
   wherein the annular duct (16) comprises an annular and half-shell shaped upper duct portion (26) and a correspondingly shaped lower duct portion (28),
   wherein the annular duct (16) extends into an interior chamber (18) of the tubular body (12) via an annular gap (20) extending between an inside facing side wall portion (15) of the tubular body (12) and a first insert (30; 50).

2. The inertial separator according to claim 1, wherein an annular center of the annular duct (16) coincides with a longitudinal axis (1) of the tubular body (12).

3. The inertial separator according to claim 1, wherein the annular duct (16) provides an annular vortex chamber downstream of the inlet (14) and upstream of the annular gap (20).

4. The inertial separator according to claim 1, wherein the annular duct (16) is arranged at an upper end of the interior chamber (18).

5. The inertial separator according to claim 1, wherein the upper duct portion (26) and the lower duct portion (28) face towards each other with their half-shell profiles to form an essentially closed duct (16) except for the annular gap (20).

6. The inertial separator according to claim 1, wherein a total transverse cross-sectional area of the annular gap (20) is at least 0.2-, 0.3-, 0.5-, 1-, 1.5-, 2-, 3-, 4-, or 5 times a cross section of the inlet (14).

7. The inertial separator according to claim 1, wherein a cross sectional diameter of the upper duct portion (26) exceeds a corresponding diameter of the lower duct portion (28) by the radial width of the annular gap (20).

8. The inertial separator according to claim 1, wherein the annular duct (16) comprises a spiral shaped cross-section merging in the annular gap (20).

9. The inertial separator according to claim 1, wherein the center axis of the inlet (14) substantially co-aligns with an annular axis of the annular duct (16).

10. The inertial separator according to claims 1, wherein the lower duct portion (28) is formed in the first insert (30; 50) having an axially extending central shaft portion (33).

11. The inertial separator according to claim 10, wherein the upper duct portion (28) is formed in a second insert (32) extending across the cross section of the interior chamber (18) and having a central outlet channel (24) in fluid communication with the shaft portion (33) of the first insert (30; 50).

12. The inertial separator according to claim 11, wherein the shaft portion (33) and the outlet channel (24) are mutually press fitted.

13. The inertial separator according to claim 11, wherein the tubular body (12), the first insert (30; 50) and/or the second insert (32) are free of undercuts.

14. The inertial separator according to claim 11, wherein the tubular body (12), the first insert (30; 50) and/or the second insert (32) comprise injection molded plastic components.

* * * * *